Nov. 15, 1966 M. L. SALISBURY 3,285,522
APPARATUS FOR COMBINING FLUIDS
Filed Aug. 24, 1964
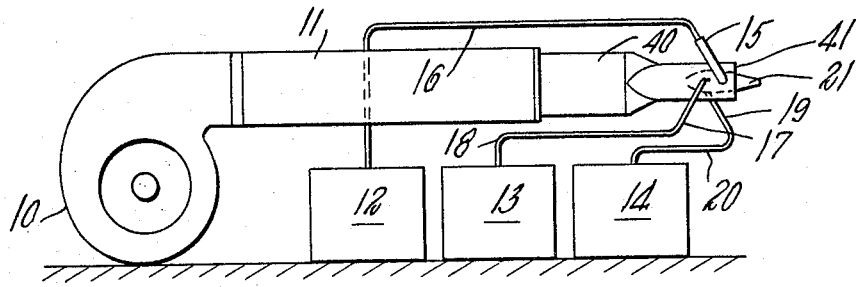
Fig. 1.
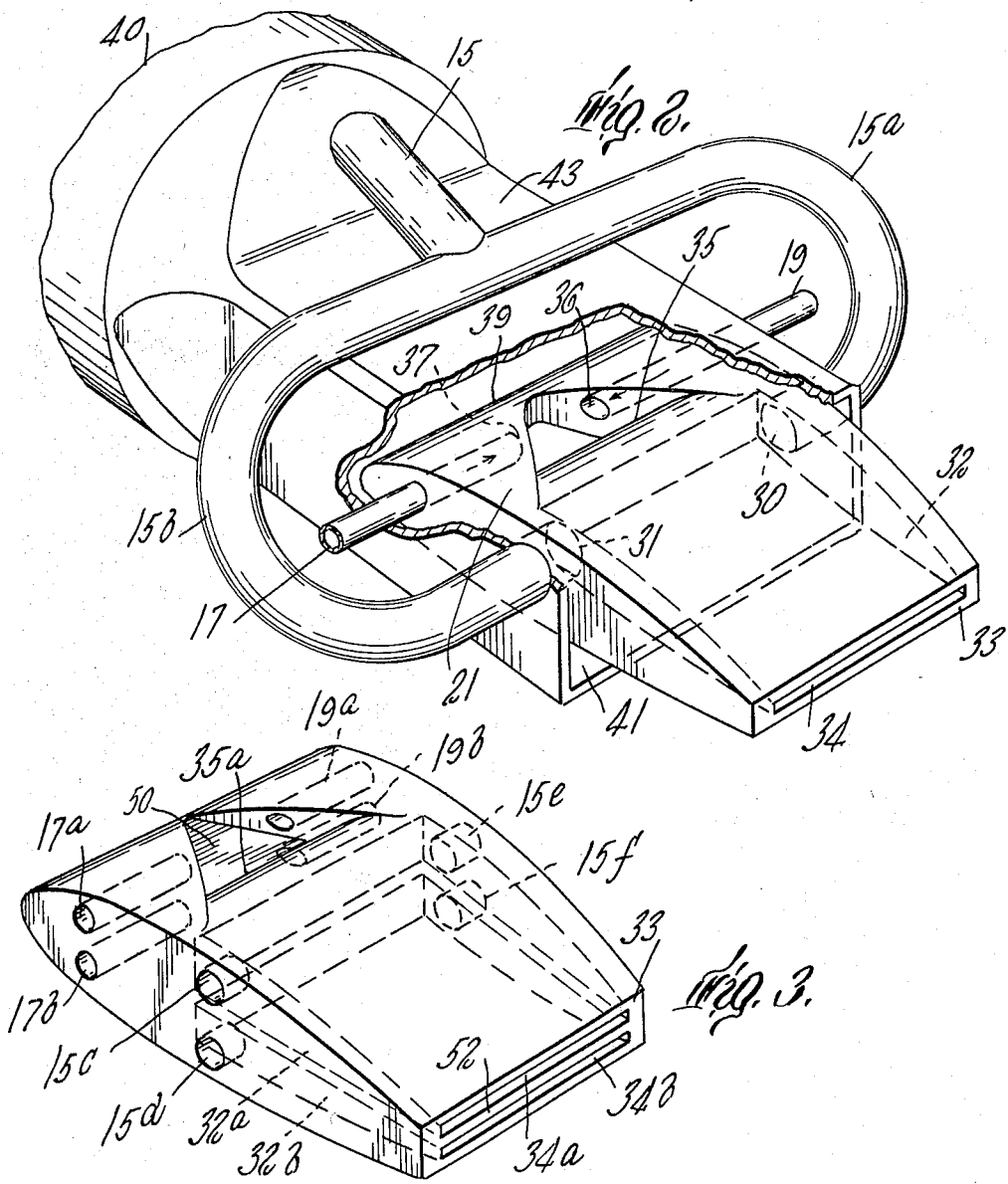
Fig. 2.
Fig. 3.

United States Patent Office 3,285,522
Patented Nov. 15, 1966

3,285,522
APPARATUS FOR COMBINING FLUIDS
Mack L. Salisbury, St. Paul, Minn., assignor to Sprayfoil Industrial Corporation, Minneapolis, Minn., a corporation of Minnesota
Filed Aug. 24, 1964, Ser. No. 391,527
10 Claims. (Cl. 239—429)

This application is a continuation in part of my copending application, Serial No. 153,819, filed November 21, 1961, now abandoned.

This invention relates to the mixing of fluids, including the combining of liquids and/or solids with liquids, liquids and/or solids with gases, and the projection of the resulting mixture, including the spraying thereof, onto desired surfaces or into a desired volume where it is useful for any desired purpose.

More particularly, the invention is concerned with a new and improved device for successively adding to and homogeneously mixing with a first fluid stream, which may be a liquid or a gas, two or more dissimilar fluid materials, as, for exampel, first, a liquid, and second, a stream of solid particles entrained in a gas; or first, two stream of solid particles entrained in a gas; or first, two dissimilar liquids, and second, still a third dissimilar liquid or, alternatively, second, a stream of solids in a gaseous or liquid vehicle, the order of mixing being selected to yield optimum results.

According to my invention, the additional fluids to be mixed are added to a stream of the first fluid at two successive zones of high turbulence created therein by the use of the specially shaped baffle or foil disclosed and described in Patent No. 2,770,501, of Henri Coanda, to whose invention the present invention relates.

The invention has all the advantages of simplicity, efficiency, versatility, accurate control of quantities of different materials mixed, low cost, and control of the Coanda device, with the additional advantages of permitting the successive mixing of several additional fluids (including liquids and gases and streams of solids in either liquid or gas) in a desired order in a manner not possible employing the Coanda technique alone.

In accordance with the invention, I dispose in a fluid, either liquid or gas, for relative movement with respect thereto, at the outlet of a conduit for said fluid a baffle comprising a body whose upper and lower oppositely directed surfaces are smoothly curved, convex and except for special purposes symmetrical, each with the shape of the convex surface of an airfoil and having a so-called "tear-drop," profile providing a leading edge and a trailing edge with respect to fluid flow. For convenience in this application, I have termed such a body a "fluid-foil." Fluid flowing over the diverging surfaces of the leading edge of the foil divides in a V into two at least partially laminar streams, between which a low pressure zone occurs. At this zone, between the leading and trailing edges a recess is provided in at least one surface of the fluid foil and preferably through to the other surface thereof, this recess greatly intensifying the turbulence of flow in the zone. For certain applications recesses are provided in both surfaces of the foil but are separated from each other by a partition and in this form of the invention the fluid foil surfaces are not necessarily symmetrical. One surface of the recess is parallel to the leading edge of the foil and is shaped to form a second leading edge which tends to induce a second zone of at least partially laminar fluid flow over the foil surafces downstream from the highly turbulent zone produced by the recess. The trailing part of the foil produces a second zone of turbulence adjacent thereto. The trailing edge of the foil is not a fine edge, but rather a blunt, abrupt discontinuity, which has particularly desirable effects in producing turbulence and low pressure when such trailing edge protrudes beyond the open end of the conduit in which the foil is disposed. Separate passages are provided within the foil, at least one of which has an outlet within the recess and at least one of which has an outlet at the trailing edge of the foil, the passages being adapted to be connected by suitable ducts to sources of fluid so as to permit the introduction of such fluids in each zone of turbulence. Preferably, at least two such passages have their outlets opposite each other in the recess to permit the emission of opposing jets which collide and produce a disc of fluid which breaks up and mixes with the passing stream, and additional one or more such passages open into a cavity in the foil preferably having a rearwardly discharging rectangular opening in or near the trailing edge of the latter. The foil is preferably mounted at the outlet of a fluid conduit through which is forced the first fluid stream into which the additional fluids are mixed and which serves as a vehicle and a propellant to project the mixture against the desired surface or into the desired volume. Where the first fluid comprises a gas, as air from a blower, the device is adapted for spraying a mixture of finally atomized different liquids, or liquid and/or solid particles, one or more of the same being combined with the gaseous stream at the first zone of turbulence in the vicinity of the recess and one or more additional liquids or solids being added to the mixture in the second turbulent zone near the trailing edge of the foil.

Further objects, features and advantages of the invention will emerge from a consideration of the following detailed description of a presently preferred embodiment thereof, wherein I have set forth the best mode now known to me of carrying out the same, taken in conjunction with the accompanying drawings in which like numerals refer to like parts in the several views and in which:

FIG. 1 is a pictorial and block diagrammatic view of a system embodying the invention;

FIG. 2 is an isometric view on a much larger scale showing the details of the fluid foil and its relationship to the outlet of the conduit in which it is mounted, portions of the latter being broken away to disclose the complete foil; and FIG. 3 is a fragmentary view similar to FIG. 2, omitting the conduit, of a modified form of fluid foil in accordance with the invention.

The embodiment of the invention shown in the drawings comprises a blower 10 for discharging a stream of air of considerable velocity through the conduit 11 into the conduit 40, the latter being provided with a rectangular extension 43 having a rectangular outlet 41. Within the rectangular portion 43 of the conduit 40 is mounted the fluid foil of the invention, indicated generally by the numeral 21. The foil has a leading edge 39 and a trailing edge 33, the latter of which is blunt, projecting outwardly beyond the extremity 41 of the conduit 40. The foil 21 is provided with a substantially triangular recess downstream of the leading edge 39 and with its apex nearest such edge, the downstream edge of such recess being shaped to provide a second leading foil edge 35 forming the base of the substantially triangular opening. As previously indicated, the fluid foil 21 has a so-called tear-drop profile, with symmetrical upper and lower convex surfaces, each being comparable to the convex surface of the usual airfoil.

The foil 21 is provided with a pair of internal passages opening at 36 and 37 into the cavity just mentioned and having external connecting ducts 17 and 19 adapted to be placed in communication with sources of fluid of either the same or different kinds for introduction into such cavity. The foil is also provided with an internal chamber 32 near the trailing edge 33 having a rectangular outlet 34 opening for longitudinal flow in the same direction as flow through the conduit 40 at such trailing edge. Fluid may be introduced into the chamber 32 through openings 30 and 31 by means of passage 15 which forms into two branches, 15a and 15b, leading into opposite lateral sides of the foil 21. The chamber 32, opening 34 and passage 15 each has a cross-section substantially greater than those of ducts 17 and 19, being adapted to conduct air-borne solid particles or a substantial volume of gas.

As seen in FIG. 1, the assembly illustrated in FIG. 2 is mounted at the extremity of the conduit 40 which in turn is in communication with the blower 10 by means of the continuation conduit 11. The sources of fluid 12, 13 and 14 may be connected by means of tubes, 16, 18 and 20 to the ducts 15, 17 and 19, respectively.

In FIG. 3 I have illustrated a modified form of the invention wherein the recess or cavity in the fluid foil does not extend completely through from one surface to the other thereof. A longitudinally extending partition 50 is mounted within the cavity dividing the second leading edge formed by the base of the triangular recess into upper and lower surfaces, the upper of which is designated by numeral 35a. Similarly the chamber 32 (in FIG. 2) is in this case divided by a partition 52 into upper and lower chambers 32a and 32b having corresponding rectangular outlets 34a and 34b in the trailing edge 33 of the foil. With the configuration shown in FIG. 3, the capability of introducing four additional separate fluids for mixing is achieved. Thus the upper and lower recesses are each fed by the pairs of ducts 17a, 19a and 17b, 19b, whereas the upper and lower chambers in the trailing portion of the foil are fed by corresponding pairs of ducts 15c, 15d and 15e, 15f.

While it is preferable that the fluid foil shown in FIGS. 1 and 2 be symmetrical, such is not necessarily true of the modification of FIG. 3. Where the fluids to be introduced through passages 17a, 19a differ in viscosity from those introduced through passages 17b, 19b, it may be desirable to vary the contour of the foil surfaces, increasing or decreasing the convexity of one or the other to produce optimum results.

Illustrative of the many uses which may be made of the device of the present invention is the spraying of glass fibers and epoxy resins upon a form or into a mold wherein at least four fluids in differing states of dissimilar characteristics must be utilized. First is required a gaseous stream into which the other ingredients are mixed to serve as a vehicle and propellant to project the mixture upon the form or into the mold. Secondly, at least two different liquids must be combined with each other and with the gaseous stream to provide a hardenable epoxy compound and finally a quantity of properly sized air-borne glass fibers must be added to the mixture of gas and epoxy compound mixture so that the uniform mixture will be applied to the form or mold. In the device as shown in FIG. 2, the gas vehicle and propellant is provided by the output blast of the blower 10. As this gas passes over the foil 21, the two liquids to be mixed with each other forming the epoxy compound are introduced through the openings 36 and 37 into the triangular cavity in the fluid foil. But due to the lower pressure in the cavity and the turbulence present thereabout, the liquids will be mixed with each other and entrained in the gaseous stream, carried over the second leading edge 35 toward the trailing edge 33 of the fluid foil. The glass fibers carried by a second gaseous vehicle may be introduced into the chamber 32 through the openings 30 and 31 merging into the first mixture at a second zone of turbulence created in the vicinity of the trailing edge 33. The result of such a mixing of the various ingredients is a uniform mixture which may be projected onto a form or mold where it will harden into the desired glass fiber and epoxy resin product.

Another example of a use which may be made of the novel device in accordance with the invention is the treatment of seeds and/or grain with suitable chemicals in liquid or dry form so as to prevent diseases or to impart to the seeds or grain protective and/or growth-promoting qualities. For such a purpose, again a first fluid stream of high velocity air may be produced by the blower 10 in the conduit 40. The liquid or dry chemicals may be added to the air stream and uniformly mixed therewith by introduction through the passages 17 and 19 into the triangular cavity in the fluid foil. The seeds or grain to be treated may be blown out of the rectangular opening 34 in the trailing edge 33 of the fluid foil having been introduced therein through the passage 15. In such an application it is evident that every single grain or seed will come into intimate contact with the treating chemical, the output mixture being propelled by the gaseous vehicle into any suitable container for storage or transportation.

Still another example of the utility of the device in accordance with the invention is the homogeneous mixing of three fluids in the liquid state. Thus, water of desired velocity may be pumped through the conduit 40 and past the fluid foil 21. A petroleum emulsifying agent may be mixed with the water at the first zone of turbulence at the cavity, being introduced through the passages 17 and 19. An insecticide such as DDT may then be added to the mixture in a homogeneous manner by being introduced through passage 15 and discharged through the opening 34 into the passing liquid stream at the second zone of turbulence.

In still another example, the device of the invention may be mounted in the inlet of a steam boiler and a plurality of additives, water softeners, and chemicals for retarding corrosion and scale formation may be mixed in the make-up water as it is added to the boiler, each additive being introduced through one or more of the different ducts into the two zones of turbulence created by the fluid foil.

The position of fluid foil member 21 with respect to outlet 41 is dependent, to a certain extent, on the velocity of the fluid flowing into conduit 40 and exiting through outlet 41. Under various conditions the position of fluid foil 21 may be entirely within conduit 40 or the leading edge 39 may be positioned substantially at outlet 41, although where liquids are to be atomized, best results are obtained where the trailing edge projects beyond the conduit so that the air of the atmosphere can increase turbulence at the trailing edge. The optimum position of fluid foil 21 with respect to outlet 41 of duct 40, for any given application of my invention, may be readily determined through application of the knowledge and experience of a skillful operator or by simple trial and error. It will be found that the fluid foil may provide superior operation when it is entirely within the conduit under one application while other applications may require various intermediate positions and still other applications may require a position outside of the conduit. Since the operation of my invention requires relative movement between fluid foil member 21 and a fluid, certain applications will arise in which fluid conduit 40 may be eliminated. For example, use in air-borne applications wherein material is distributed from an airplane, the movement of the fluid foil through the air will provide the necessary velocity of the fluid air over the fluid foil to provide satisfactory operation according to the principles of my invention. By way of another example, it has been noted that one or more fluid foil members may be mounted at the end of a rotating arm which will provide the necessary relative movement between the fluid foil and the fluid medium through which it is moving. Suitable mounting at the tips of the rotor of a helicopter will provide satisfactory operation.

Even greater versatility is possible by use of the embodiment of FIG. 3 wherein up to four dissimilar fluids may be first mixed with a fluid stream at the divided triangular cavity and two additional dissimilar fluids added thereto at the trailing edge of the fluid foil.

In view of the fact that the rapidly moving fluid stream passing by the fluid foil will create zones of depression both in the triangular cavity and at the trailing edge of the foil, for some applications it may not be necessary to supply the additional fluids to the ducts 15, 17 and 19 under pressure. Dependent upon the characteristics of the material, simple tubes to reservoirs of material may be utilized and the reduction in pressure will serve to draw the material from each source into the fluid foil and out into the passing fluid stream.

While I have herein disclosed and described a presently preferred embodiment of the invention, it will nevertheless be understood that the same is capable of modifications and changes nevertheless within the scope of the appended claims. For example, for some applications the geometrical shape of the cavity or recess may take other than triangular form, and the foil may have a geometrical wall shape upstream from the second leading edge of various types.

I claim:

1. Apparatus for combining a plurality of fluids, comprising:
   a fluid conduit, and
   a fluid foil positioned at least partly within said conduit, said fluid foil having
      a leading edge and a trailing edge,
      at least one recess between said edges the downstream boundary of which forms a second leading edge,
      at least one passage communicating with said recess to conduct fluid thereinto to form a mixture with a fluid passing through said conduit, and
      at least one other passage having an opening at said trailing edge to conduct fluid thereto for mixing with said mixture.

2. Apparatus for combining a plurality of fluids, comprising:
   a fluid conduit, and
   a fluid foil positioned at least partly within said conduit, said fluid foil having
      a leading edge and a trailing edge,
      a triangular recess extending through said foil between said edges and having its apex directed toward said leading edge, the downstream boundary of said recess forming a second leading edge,
      a pair of passages communicating with said recess so arranged as to discharge opposed jets of fluid thereinto,
      a chamber located between said recess and said trailing edge, said chamber having an opening in said trailing edge, and
      a second pair of opposed passages communicating with said chamber for introducing fluids thereinto for discharge through said opening.

3. Apparatus as claimed in claim 2 wherein said opening in the trailing edge of said fluid foil is rectangular and extends substantially the length of said edge.

4. Apparatus as claimed in claim 2 wherein said recess and said chamber are both divided into two separate parts by longitudinal partitions and
   separate pairs of passages supply fluid to each part.

5. For use in fluid combining apparatus a fluid foil, comprising,
   a body adapted to be located in a fluid stream, said body having
      upper and lower convex fluid foil surfaces,
      first and second leading edges and a trailing edge,
      a triangular recess extending from one of said surfaces to the other at a location between said first leading edge and said trailing edge with its apex facing said first leading edge, the downstream boundary of said recess comprising said second leading edge,
      at least one passage communicating with said recess to conduct fluid thereinto,
      a chamber located between said recess and said trailing edge having an opening at said trailing edge, and,
      at least one other passage communicating with said chamber for introducing fluid thereinto for discharge through said opening.

6. Apparatus as claimed in claim 5 including
   a pair of passages opening into said recess so arranged as to discharge opposed jets of fluid thereinto, and
   a second pair of passages so arranged as to discharge opposed jets of fluid into said chamber.

7. Apparatus as claimed in claim 6 wherein said opening in said trailing edge is substantially rectangular and extends substantially the length of said edge.

8. Apparatus as claimed in claim 6 whrein both said recess and said chamber are divided into separate parts by longitudinal partitions and including
   separate pairs of passages to supply fluid to each part.

9. Apparatus as claimed in claim 6 wherein said fluid foil surfaces are symmetrical with respect to a plane located therebetween.

10. Apparatus as claimed in claim 8 wherein said fluid foil surfaces are assymetrical with respect to a plane between them.

References Cited by the Examiner

UNITED STATES PATENTS

| | | | |
|---|---|---|---|
| 2,585,205 | 2/1952 | Young | 239—430 |
| 2,613,999 | 10/1952 | Sher et al. | 239—429 |
| 2,770,501 | 11/1956 | Coanda | 239—429 |
| 2,907,557 | 10/1959 | Coanda | 261—78 |

EVERETT W. KIRBY, *Primary Examiner.*